(12) United States Patent
Lee

(10) Patent No.: US 9,491,373 B2
(45) Date of Patent: Nov. 8, 2016

(54) LIGHT CONTROL APPARATUS FOR AN IMAGE SENSING OPTICAL DEVICE

(71) Applicant: SODY Co., Ltd., Buk-gu, Gwangju (KR)

(72) Inventor: Jong-Cheon Lee, Gwangsan-gu (KR)

(73) Assignee: SODY Co., Ltd., Buk-gu, Gwangju (KR)

( * ) Notice: Subject to any disclaimer, the term of this patent is extended or adjusted under 35 U.S.C. 154(b) by 54 days.

(21) Appl. No.: 14/565,485

(22) Filed: Dec. 10, 2014

(65) Prior Publication Data

US 2015/0163387 A1 Jun. 11, 2015

(30) Foreign Application Priority Data

Dec. 10, 2013 (KR) .................. 10-2013-0153490
Dec. 23, 2013 (KR) .................. 10-2013-0161639

(51) Int. Cl.
 *H04N 5/238* (2006.01)
 *G02F 1/133* (2006.01)
 *G02F 1/1343* (2006.01)
 *G02F 1/137* (2006.01)
 *H04N 5/225* (2006.01)

(52) U.S. Cl.
 CPC .......... *H04N 5/238* (2013.01); *G02F 1/13306* (2013.01); *G02F 1/13725* (2013.01); *G02F 1/134309* (2013.01); *H04N 5/2254* (2013.01)

(58) Field of Classification Search
 CPC .......................... H04N 5/238; H04N 5/2254
 See application file for complete search history.

(56) References Cited

U.S. PATENT DOCUMENTS

| | | | | |
|---|---|---|---|---|
| 5,893,622 A * | 4/1999 | Gold | ...................... | G02B 5/005 349/142 |
| 6,804,037 B1 * | 10/2004 | Nito | ................... | G02F 1/13318 345/691 |
| 7,563,041 B2 * | 7/2009 | Kang | .................. | H04M 1/0264 396/506 |
| 8,319,866 B2 | 11/2012 | Yamano | | |
| 2002/0145687 A1 * | 10/2002 | Mitsui | ............... | G02F 1/133603 349/113 |
| 2011/0007204 A1 * | 1/2011 | Yamano | ................. | G02B 5/223 348/362 |
| 2011/0069179 A1 * | 3/2011 | Bathiche | ............ | H04N 5/23206 348/207.1 |
| 2012/0154887 A1 * | 6/2012 | Kim | ...................... | G02B 1/116 359/230 |
| 2014/0053111 A1 * | 2/2014 | Beckman | ............ | G06F 3/04812 715/856 |

(Continued)

FOREIGN PATENT DOCUMENTS

| JP | 2002-365621 A | 12/2002 |
|---|---|---|
| JP | 3918500 B2 | 5/2007 |

(Continued)

*Primary Examiner* — Sang V Nguyen
(74) *Attorney, Agent, or Firm* — Panitch Schwarze Belisario & Nadel LLP

(57) ABSTRACT

An apparatus for controlling the quantity of light incident on an image sensor by controlling size or shape of a diaphragm and also by adjusting light transmittance of the diaphragm is provided. The light control apparatus is disposed on the light path of the image sensing device and controls a quantity of light incident on the image sensor. The light control apparatus includes a Guest-Host LCD panel applied no polarizing film and a control unit for reducing the time to take multi-frame detection by driving voltages which are applied to respective pixels of the Guest-Host LCD panel, to be increased at least when taking multiple frames in series. The Guest-Host LCD panel has a plurality of pixels forming closed curves or boundaries on a plane, which are electrically driven individually. Also, the pixels have uniform light transmittance throughout the entire azimuth of the closed curves or boundaries with an origin.

11 Claims, 10 Drawing Sheets

(56) References Cited

U.S. PATENT DOCUMENTS

| | | | |
|---|---|---|---|
| 2014/0055721 A1* | 2/2014 | Choi | G02F 1/1333 349/96 |
| 2014/0240346 A1* | 8/2014 | Kawaguchi | G09G 5/377 345/629 |
| 2014/0240568 A1* | 8/2014 | Yamagata | H04N 5/378 348/308 |
| 2014/0300805 A1* | 10/2014 | Davis | H04N 5/238 348/362 |
| 2014/0313345 A1* | 10/2014 | Conard | G06K 9/00664 348/169 |
| 2015/0092082 A1* | 4/2015 | Okamoto | H04N 5/23293 348/231.6 |

FOREIGN PATENT DOCUMENTS

| | | | | |
|---|---|---|---|---|
| JP | 2010-148122 A | | 7/2010 | |
| JP | 2014-165845 | * | 9/2014 | H04N 5/378 |
| KR | 1999-008791 A | | 2/1999 | |
| KR | 10-0852720 B1 | | 8/2008 | |
| KR | 10-0874224 B1 | | 12/2008 | |
| KR | 10-1097145 B1 | | 12/2011 | |
| KR | 10-2013-0094662 | * | 8/2013 | H04N 5/232 |
| KR | 10-2013-0094662 A | | 8/2013 | |

* cited by examiner

LIGHT CONTROL APPARATUS FOR AN IMAGE SENSING OPTICAL DEVICE

BACKGROUND OF THE INVENTION

1. Field of the Invention

The present invention relates generally to a light control apparatus for an image sensing device and, more particularly, to an apparatus for controlling an amount of light incident on an image sensing device by adjusting size of a diaphragm or light transmittance of the diaphragm.

2. Description of the Related Art

There have been recent demands for miniaturization and high performance of image sensing devices such as digital video cameras, digital still cameras, and smart-phones. To meet such demands, in other words, to make the image sensing device smaller, a miniaturized and high-density integrated CCD (Charge Coupled Device) or a high-density CMOS (Complementary Metal-Oxide Semiconductor) chip is used as the image sensing tool.

Also, to miniaturize the size of the image sensing device, it is necessary to reduce the size of both lens and diaphragm. The usual optic diaphragm applied to a general image sensing device is an IRIS system. The IRIS system in which triangular diaphragm blades partially overlap each other and are arranged to make a round shape in the lens aperture, mechanically or electrically controls the diaphragm blades to adjust the size of the round hole, whereby it controls the quantity of light incident on the image sensing tool.

To miniaturize the size of the IRIS system while retaining the performance of the system presents technical difficulties. These technical difficulties will be specifically described herein.

To reduce the size of the IRIS system, it is necessary to reduce both the number of the diaphragm blades and the size of each individual diaphragm blade. Reducing both the number and size of the diaphragm blades leads to a reduction of the aperture diameter of the diaphragm of the IRIS system and to a limit of the number of levels upon the quantity of incident light. Therefore, it is difficult to get clear images in both dark and bright scenes by using miniaturized IRIS system. Also, as the light diffraction is intensified in the peripheral regions between the miniaturized diaphragm blades, the image recognized by the image sensor may be transformed. Consequently, it is not easy to precisely produce the miniaturized diaphragm blades and but also to minimize the IRIS system using the diaphragm blades.

Recently, using LCD (Liquid Crystal Display) technology, a method of implementing an electro-optic shutter or a method of controlling light transmittance is being proposed to solve the above problem [Patent Documents 1 to 11].

Patent Documents 1, 2, 3, 5, and 11 describe the method for applying an LCD shutter as an optical shutter to the image sensing device. However, those methods present problems that, due to the polarizers attached on the LCD panel, the light transmittance of the LCD shutter at clear state is too low to get clear images in dark circumstances, and if the polarized light is incident on the image sensing device, the image quality may be compromised.

In another related art, the suggested method involves electrically controlling the size or shape of the diaphragm by applying an LCD to the optical system of the image sensing device [Patent Documents 7, 11]. However, the method has problems including the loss in light transmittance due to a polarizing plate applied to the LCD, the transformation of an image attributable to the strong interaction between incident light and the polarizing plate, and difficulties in maintaining uniform light transmittance of the diaphragm due to the optical non-uniformity of electrode patterns that are formed to drive a plurality of pixels of the LCD. Therefore, the method has not been put to practical use.

These days, for improving image quality of digital cameras and smartphone cameras, a multi-frame image sensing method is applied, which gets multiple images for one object by changing the setting value of the camera over a short period of time and selects the best one among the multiple images [Reference to Korean Patent Publication No. 2012-0016089].

DOCUMENTS OF RELATED ART (Patent Document 1) Korean Patent Application Publication No. 1997-030923, "ELECTRONIC SHUTTER APPARATUS OF A DIGITAL STILL CAMERA"

(Patent Document 2) Korean Patent No. 0874224, "high-speed camera phone shutter"

(Patent Document 3) Korean Patent No. 1097145, "Device and method for controlling quantity of incident light"

(Patent Document 4) U.S. Pat. No. 8,319,866, "Imaging Optical System and Imaging Apparatus"

(Patent Document 5) U.S. Pat. No. 7,563,041, "Camera Module with Brightness Adjustable LCD shutter in Portable Wireless Terminal"

(Patent Document 6) U.S. Patent Application Publication No. 2011-0007204, "Imaging Optical System and Imaging Apparatus"

(Patent Document 7) U.S. Pat. No. 5,893,622, "Optical Aperture with Predetermined Attenuation Patterns Having Polarizers That are Black Guest Host Liquid Crystal or Multilayer, Thin film, Polarizing Beam Splitting Prism"

(Patent Document 8) Japanese Patent Publication No. 2010-148122, "Dimmer and imaging apparatus and method for driving both"

(Patent Document 9) Japanese Patent No. 3918500, "Imaging Device"

(Patent Document 10) Japanese Patent Application Publication No. 2002-365621, "Light Controlling Device and Imaging Device"

(Patent Document 11) Korean Patent No. 0852720, "Electric dimming device and its driving method"

SUMMARY OF THE INVENTION

The object of the present invention is to provide a method of reducing the size of a diaphragm to miniaturize an image sensing optical system in an image sensing device.

Another object of the present invention is to provide a method of detecting a clear image in a variety of external environments by making it possible to select the degree of the diaphragm opening, which enlarges the diaphragm opening in a dark place to admit more light into an image sensor. On the contrary, in a bright place, the method reduces the diaphragm opening to reduce the amount of light so as to admit the proper quantity of light into the image sensor.

Also, the present invention intends to provide a method of controlling the amount of incident light to correspond to the function of the image sensor even at the same diaphragm opening, the incident light traveling through the diaphragm into the image sensor.

Additionally, the present invention intends to provide a method for minimizing the distortion of the image, which may be caused by light diffraction due to the reduced size of the diaphragm blades.

The objects of the present invention besides the above objects will be understood through the following descriptions.

A light control apparatus for an image sensing device according to an embodiment of the present invention is an apparatus, disposed on the light path into an image sensor, for controlling the amount of incident light into the image sensor.

The light control apparatus includes:

a Guest-Host LCD panel applied no polarizing film; and a control unit for reducing multi-frame detection time by driving average voltage, which is applied to respective pixels of the Guest-Host LCD panel, to be increased at least when taking multiple frames in series.

The Guest-Host LCD panel includes a plurality of pixels forming closed curves or boundaries on a plane, which are electrically driven individually.

The pixels have uniform light transmittance throughout an entire azimuth along a central axis of the closed curve or boundary.

Technical aspects or features, advantages besides the above descriptions become clear by the following drawings, claims, and the detailed description of the embodiments.

According to an embodiment of the present invention, it is possible to miniaturize a light control apparatus and to improve response time of the light shutter using an LCD panel having high light transmittance, and the apparatus electro-optically controls light transmittance of the diaphragm.

Also, the method may detect a clear image within a short period of time in a variety of environments by making it possible to select the degree of the diaphragm opening.

Also, the method may control the amount of incident light to correspond to the function of the image sensor, even at the same diaphragm opening, by controlling light transmittance through adjusting average voltage applied to LCD pixels; the incident light traveling through the diaphragm into the image sensor.

Also, the method may recognize a clear and deep image by controlling both the size of the diaphragm and light transmittance, which sequentially applies voltages to light penetration areas of the diaphragm, comprised of a plurality of pixels, and makes the respective LCD pixels have respective gray-scale presentation because of the independent light transmittance; the voltages being applied sequentially according to the order predetermined by the LCD pixel.

Also, it is possible to variously control the degree of the diaphragm opening, to minimize the diaphragm opening, and to efficiently control light transmittance of the diaphragm, by positioning a mechanical or electrical IRIS system diaphragm and an electro-optical LCD diaphragm on the same light path and using both of the diaphragms at the same time.

By making the opening of the electro-optical LCD diaphragm smaller than the opening of the IRIS system diaphragm, it is possible to minimize the incident light allowed into the image sensor, and to improve the image depth.

Also, by making the shape of the diaphragm opening be a circle, an ellipse, or a polygon with rounded edges, it is possible to reduce the distortion of images, which is caused by light diffraction at the edge due to the reduced size of the diaphragm blades.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention. The same reference numbers will be used throughout the drawings to refer to the same or similar parts, and redundant details will be omitted to make the descriptions clear.

Figure 1:
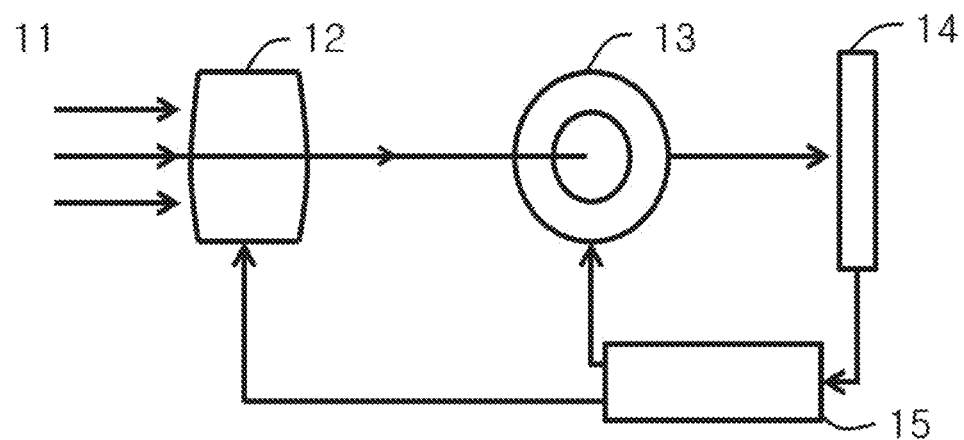
FIG. 1 is a block diagram of an image sensing device applying a light control apparatus according to an embodiment of the present invention.

FIG. 1 is a simplified block diagram of an image sensing device applying a light control apparatus according to an embodiment of the present invention. The image sensing device includes a lens unit 12 which external incident light 11 travels through; and a light control apparatus disposed on the path of the incident light that has traveled through the lens unit 12, for controlling the amount of light admitted into a image sensor 14.

The light control apparatus includes a LCD diaphragm 13. The LCD diaphragm 13 includes a Guest-Host LCD panel applied no polarizing film. The Guest-Host LCD panel includes one or more pixels forming closed curves or boundaries on a plane. The closed curve or boundary may be a shape of a circle, an ellipse, a ring, or a regular polygon.

The Guest-Host LCD panel may have two or more pixel areas. The pixel areas may each be continuously overlapped on the same plane radially with the same origin. The pixel areas each have a plurality of pixels forming closed curves or boundaries on a plane, and each pixel is configured to be electrically driven, individually. The pixels in the same drive area have uniform light transmittance or uniform gray-scale throughout the entire azimuth along the same central axis. The Guest-Host LCD having a pleochroic dye is either Normally White Mode or Normally Black Mode, and the maximum visible light transmittance thereof is over than 50%.

Referring to FIG. 1, the external incident light 11 travels through both the lens unit 12 and the LCD diaphragm 13 comprised of LCD panels and arrives at the image sensor 14. The lens unit 12 with one or more lens has functions including infrared cutoff, ultraviolet cutoff, auto-focusing function, detecting brightness of surroundings, and the like.

Also, the image sensing device further includes a control unit 15. The control unit 15 compares and analyzes the information from both the image sensor 14 and lens unit 12, and appropriately controls sensitivity of the LCD diaphragm 13, lens unit 12, and the image sensor 14. Also, the control unit 15 drives each pixel of the LCD panel to quickly change the light transmittance thereof.

Also, some lenses of the lens unit 12 may be located on the light path between the LCD diaphragm 13 and the image sensor 14, and the LCD diaphragm 13 may be located inside the lens unit 12.

Figure 2:
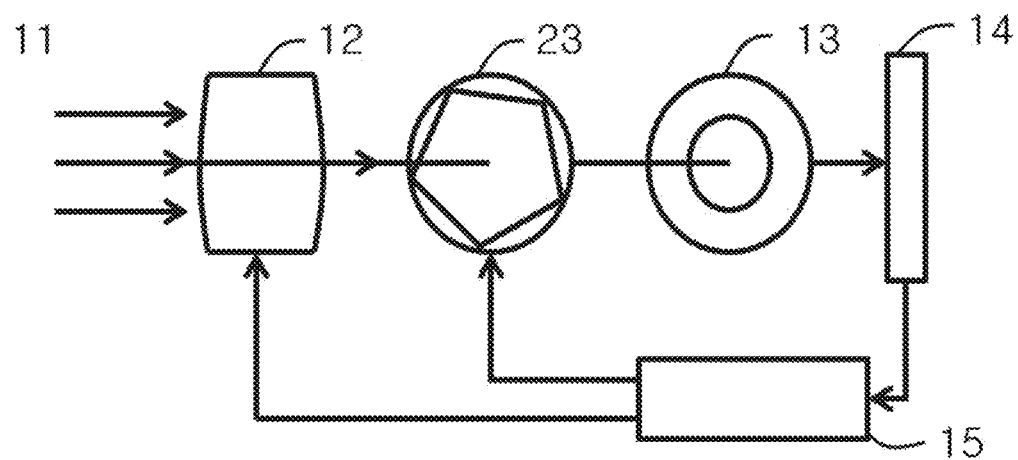
FIG. 2 is a block diagram of an image sensing device applying a light control apparatus according to another embodiment of the present invention.

FIG. 2 is a simplified block diagram of an image sensing device applying a light control apparatus according to another embodiment of the present invention. The image sensing device includes a lens unit 12 which external incident light 11 travels through; and a light control apparatus disposed on the path of the incident light that has traveled through the lens unit 12, for controlling the amount of light admitted into an image sensor 14.

The light control apparatus includes an LCD diaphragm 13 and IRIS system 23. The LCD diaphragm 13 is the same as the description of FIG. 1. The IRIS system 23 has a usual structure, and arranges a plurality of diaphragm blades to be overlapped and controls the position of the diaphragm blades electrically or mechanically, whereby it controls the amount of light.

Referring to FIG. 2, the external incident light 11 travels through the lens unit 12, the diaphragm of the IRIS system 23, and the LCD diaphragm 13 comprised of LCD panels, and reaches the image sensor 14. The control unit 15 controls the LCD diaphragm 13 and the IRIS system 23 by comparing and analyzing the information from both the image sensor 14 and lens unit 12, and appropriately controls sensitivity of the image sensor 14. The LCD diaphragm 13 applies voltage to an electrode on the LCD panel, and thus controls transmittance of light in a visible light range.

In FIG. 2, the IRIS system 23 is located at the front on the light path, and the LCD diaphragm 13 is located at the back on the light path, but the locations may be changed each other. Also, some lenses of the lens unit 12 may be located on the light path between LCD diaphragm 13 and the image sensor 14.

Figure 3:
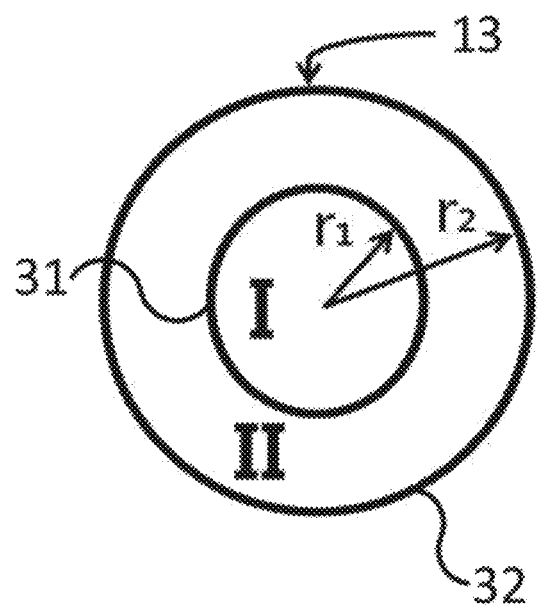
FIG. 3 is a conceptual diagram of an LCD diaphragm applied to the present invention.

FIG. 3 is a conceptual diagram of the LCD diaphragm 13 comprised of two LCD drive areas. The LCD diaphragm 13 is divided into a first pixel area (I) 31 and a second pixel area (II) 32. They form concentric circles with the center of optic axis of the lens unit 12 as the central axis. Transparent electrodes of the first pixel area (I) 31 and second pixel area (II) 32 are separated from each other and each of them is electrically driven, individually. Accordingly, the first pixel area (I) 31 and the second pixel area (II) 32 may be set to have different light transmittance.

The first pixel area (I) 31 and the second pixel area (II) 32 have circular symmetry, and each area has uniform light transmittance. In other words, incident light admitted into the LCD diaphragm 13 travels through it with uniform light transmittance throughout the entire 360 degree azimuth along the same central axis.

Generally, as a lens of smartphones or digital cameras is made to have a circular form, it is ideal that the pixel area 31, 32 of the LCD panel has a circular form. A circular form may reduce a light diffraction effect that occurs in the existing IRIS system. For a special purpose, the pixel area of the LCD panel 65 may be made to be in the shape of an ellipse or a polygon (desirably, a regular polygon). In this case, the polygon is made with rounded edges to reduce light diffraction effects.

Figure 4:
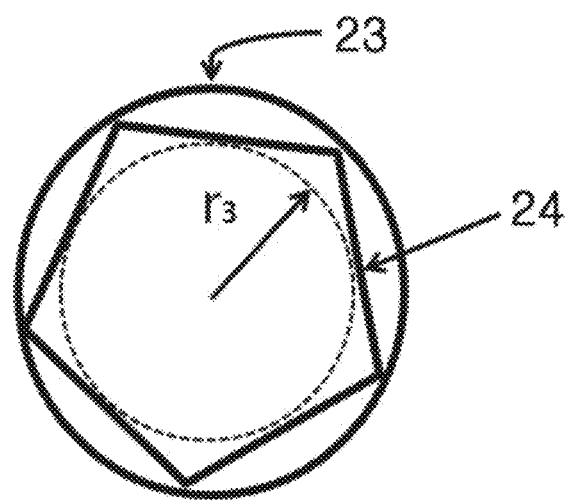
FIG. 4 is a conceptual diagram of an IRIS system applied to the present invention.

FIG. 4 is a conceptual diagram of the IRIS system applied to the present invention. The system controls the size of the diaphragm opening by moving two or more thin diaphragm blades. However, as the size of the IRIS system should be smaller to be applied to compact digital cameras or smartphones, it is not easy to precisely control the small diaphragm blades.

A usual IRIS system has 5~7 diaphragm blades, but a small IRIS system has 2~3 diaphragm blades. Accordingly, the size of the diaphragm opening is reduced to be adapted to the reduced number of the diaphragm blades. Consequently, to complement the function of the diaphragm of the small IRIS system, the present invention further includes the LCD diaphragm comprised of LCD panels, and uses two systems as the diaphragm.

For example, a radius of the inscribed circle of the diaphragm opening of the small IRIS system is referred as $r_3$, and as shown in FIG. 2, the LCD diaphragm 13 layered with the IRIS system 23 may be used. In this case, when $r_1$, a radius of the pixel area (I) of FIG. 3 is less than $r_3$, first, the diaphragm opening of the IRIS system is controlled, and additionally the light may be controlled by the LCD diaphragm.

Generally, the size of the pixel of the LCD panel is about ~100 μm, therefore, it is easy to miniaturize the LCD panel. Accordingly, the radius of the first pixel area (I) made of the LCD panel may be miniaturized less than the minimum opening of the diaphragm of the IRIS system 23. Consequently, in a small digital image sensing device, it is possible to minimize the noise from the image sensing process by enlarging the opening of LCD diaphragm with high light transmittance at low illumination environments. Also, using both the LCD diaphragm and the existing IRIS system may reduce the size of the diaphragm opened and decrease the quantity of the light incident on the image sensing tool.

Figure 7:
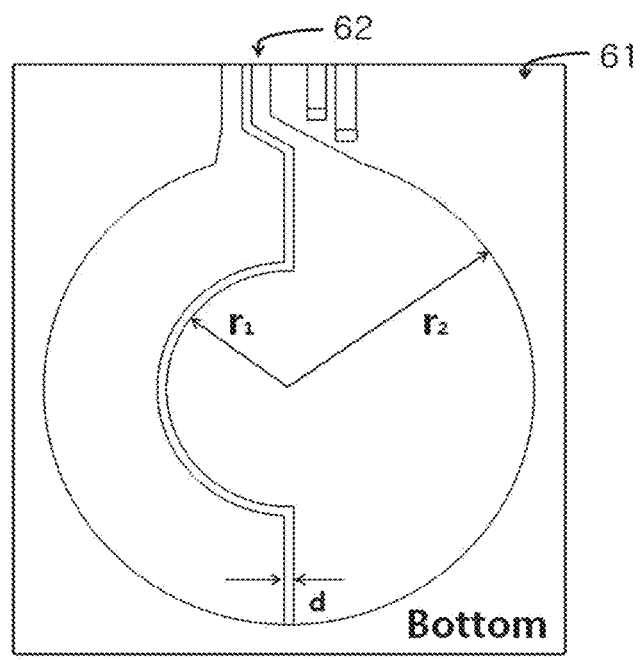
FIG. 7 is an example of a transparent electrode pattern of a lower substrate of a panel of LCD diaphragm.
Figure 8:
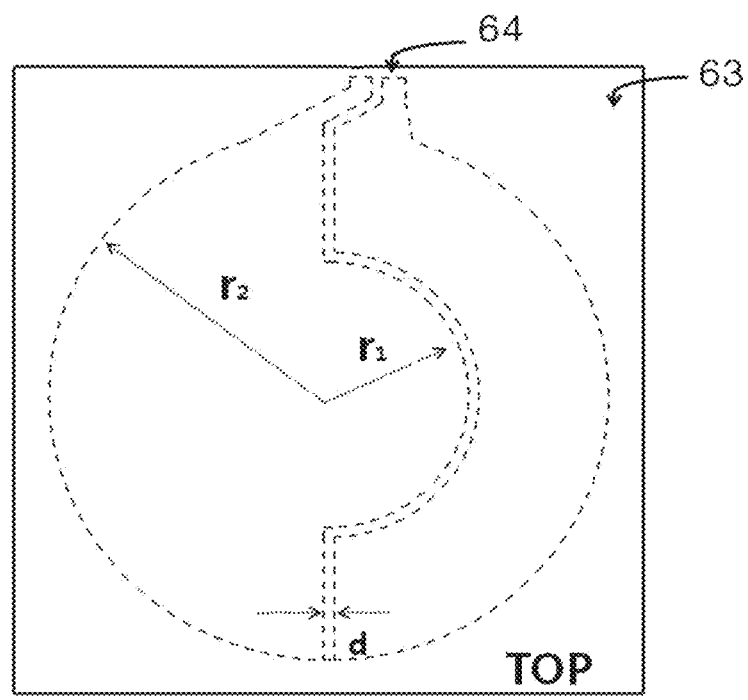
FIG. 8 is an example of a transparent electrode pattern of an upper substrate of a panel of LCD diaphragm.
Figure 9:
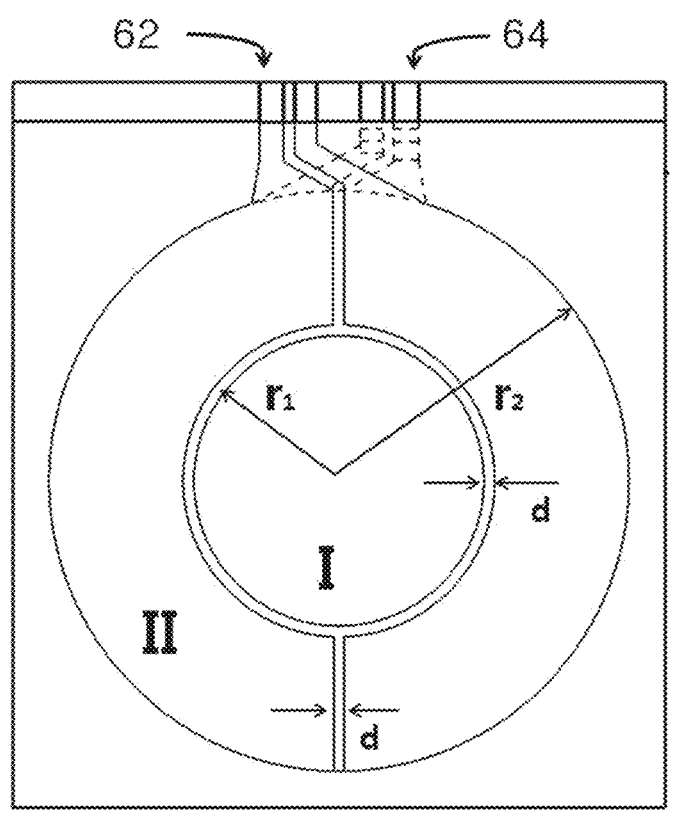
FIG. 9 is an example of a transparent electrode pattern in which the upper substrates and lower substrates are assembled into a LCD diaphragm.

FIGS. 7 and 8 are views illustrating an example of a transparent electrode pattern of the LCD diaphragm panel. FIG. 7 illustrates a transparent electrode pattern of the lower substrate 61 of the LCD diaphragm panel, and FIG. 8 illustrates a transparent electrode pattern of the upper substrate 63 of the LCD diaphragm panel. The patterned electrodes of the respective substrates are connected to an external power source of the control unit 15 through the electrode terminal 62 and 64. FIG. 9 shows an example of the transparent electrode pattern after the lower substrates and upper substrates are assembled. Voltages applied to the electrode terminals 62 and 64 of the lower substrates 61 and upper substrate 63 usually have square wave. When the voltages having 180-degree phase difference between each other are applied to the electrode of the respective substrates, it is possible to individually drive the first pixel area (I) and the second pixel area (II) by the convenient voltage.

Referring FIGS. 7 to 9, because d, an interval in the electrode patterns, is the section in which electrode is etched, the voltage is not applied to d. However, if the interval, d is very small, a harmonization occurs at the interval, in other words, liquid crystals in d are arranged similar to the arrangement of the liquid crystals in the neighboring electrode by the intermolecular interactions with the liquid crystals in the neighboring electrode. Accordingly, light transmittance of d is the same as the light transmittance of the left and right pixels, which are driven by the same voltage. In usual LCD panels, when a cell width of the liquid crystal layer is about 10 μm and d is less than 30 μm, the harmonization of light transmittance may occur. Consequently, in the second pixel area (II) of FIG. 9, the liquid crystal molecules in the section with the small interval d, in which the transparent electrode is etched, have the same arrangement as the liquid crystal molecules in the section in which the transparent electrode is not etched. Therefore, the entire second pixel area (II) has the uniform and circular symmetric light transmittance. The lower substrate 61 and the upper substrate 63 is a glass substrate or plastic substrate coated with transparent electrode, and the width of the substrates is about 100 μm. Also, it is desirable that the substrates may electrically control the amount of light.

Figure 5:
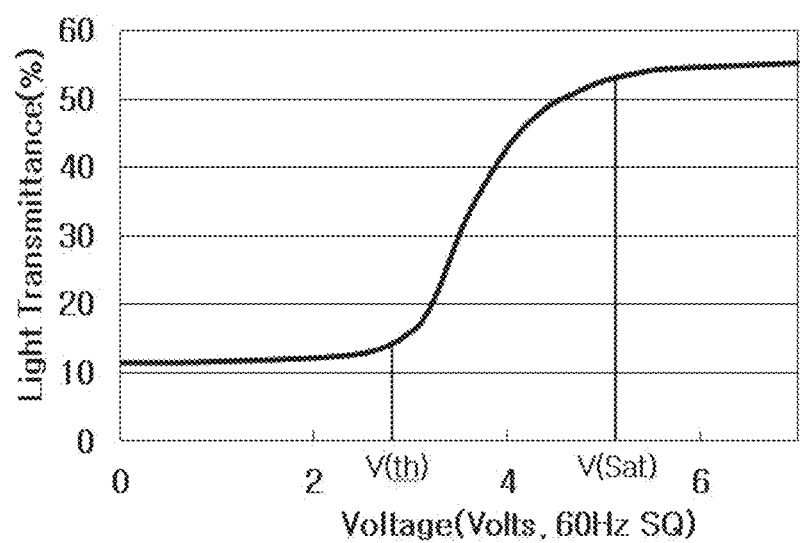
FIG. 5 is a graph of a variance in visible light transmittance of a Normally Black Mode G-H LCD panel according to applied voltage.

FIG. 5 is a graph illustrating a variation in visible light transmittance of a Normally Black Mode Guest-Host LCD panel according to applied voltage, that is, an electro-optical characteristic curve of a Normally Black Mode Guest-Host LCD. In other words, when no electric field is applied to the every pixel area 31 and 32 of the LCD panel, the light transmittance is low. When the voltage higher than V(th) is applied, the light transmittance is increased steadily. When the voltage higher than V(sat) is applied, the light transmittance gets closer to the saturated light transmittance. Also, when the voltage between V(th) and V(sat) is applied, a mid-level light transmittance may be gained. In Normally Black Mode, V(th) means a voltage corresponding to light transmittance higher than 10%, and V(sat) means a voltage corresponding to light transmittance higher than 50%.

Figure 6:
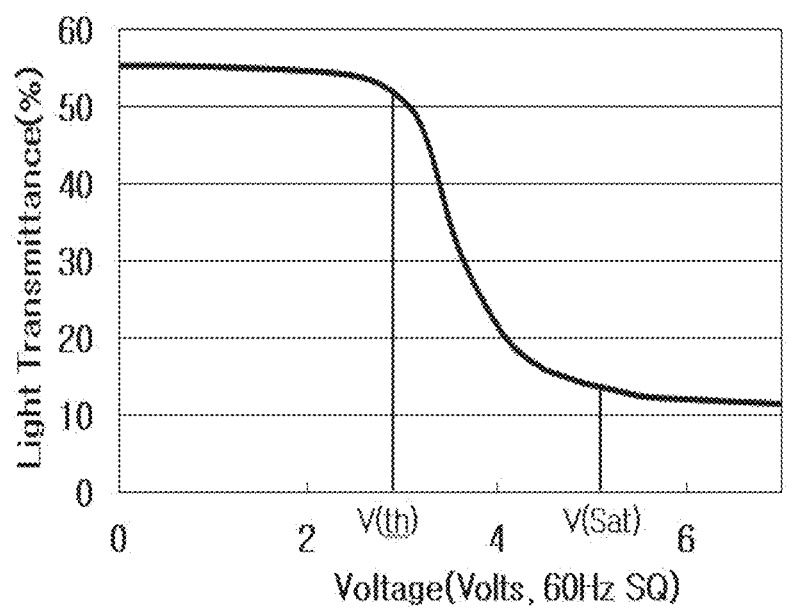
FIG. 6 is a graph of a variance in visible light transmittance of a Normally White Mode G-H LCD panel according to applied voltage.

FIG. 6 is a graph illustrating a variation in visible light transmittance of a Normally White Mode Guest-Host LCD panel according to applied voltage, that is, an electro-optical characteristic curve of a Normally White Mode Guest-Host LCD. In other words, when no electric field is applied to the every pixel area 31 and 32 of the LCD panel, the light transmittance is maintained to be high. When the voltage higher than V(th) is applied, the light transmittance is decreased steadily. When the voltage higher than V(sat) is applied, the light transmittance gets closer to the minimum light transmittance. Also, when the voltage between V(th) and V(sat) is applied, a mid-level light transmittance may be gained. In Normally White Mode, V(th) means a voltage corresponding to light transmittance higher than 50%, and V(sat) means a voltage corresponding to light transmittance lower than 10%.

A Normally Black Mode Guest-Host LCD is produced to have a twisted structure like TN (Twisted Nematic) LCD or STN (Super Twisted Nematic) LCD by adding a small amount of positive pleochroic dye molecules and of Chiral Dopant into a nematic liquid crystal with positive dielectric anisotropy. The pleochroic dye molecules less than about 5 wt % is only added into the liquid crystal, and to obtain between the 90 and 360 degree twisted structure, the amount of Chiral Dopant is adjusted.

When Normally Black Mode is applied to an LCD panel, if no voltage is applied to both the first pixel area (I) 31 and the second pixel area (II) 32 in FIG. 3, the visible light transmittance of the LCD diaphragm is the lowest. Also, the voltage higher than V(th) is applied to both the first pixel area (I) 31 and the second pixel area (II) 32 at the same time, the size of the diaphragm is not changed from the extent of the circle with radius, $r_2$, and the visible light transmittance is steadily increased. When the applied voltage is higher than V(sat), the visible light transmittance is the highest.

On the contrary, when Normally White Mode is applied to the LCD panel, if no voltage is applied to both the first pixel area (I) 31 and the second pixel area (II) 32 in FIG. 3, the size of the diaphragm is the same as the extent of circle with a radius, $r_2$, and the visible light transmittance is the highest. Also, when the voltage higher than V(th) is applied to both the first pixel area (I) 31 and the second pixel area (II) 32 at the same time, the size of the diaphragm is not changed, but the visible light transmittance is steadily decreased. When the applied voltage is higher than V(sat), the visible light transmittance is the lowest.

A Normally White Mode Guest-Host LCD is produced to have VA (Vertically Aligned) LCD structure by adding a small amount of positive pleochroic dye molecules and of Chiral Dopant into a liquid crystal with negative dielectric anisotropy. The VA LCD induces orientations of the liquid crystal to be vertical to contact surfaces by processing the lower substrate 61 and the upper substrate 63 for vertical alignment. When the applied voltage is lower than V(th), liquid crystal molecules of all liquid crystal layers between the lower substrate 61 and the upper substrate 63 are vertically aligned by the vertical alignment effect of both the lower substrate 61 and the upper substrate 63. If the voltage applied to the liquid crystal layers is higher than V(th), the liquid crystal molecules with a negative anisotropy is realigned horizontal to the substrates, and have the twisted structure by the effect of the Chiral Dopant. The pleochroic dye molecules less than about 5 wt % is only added into the liquid crystal, and to obtain between the 90 and 360 degree twisted structure when the voltage higher than V(sat) is applied to the LCD panel, the amount of Chiral Dopant is adjusted.

The method of producing a Guest-Host LCD that does not apply a polarizing plate is described in Korean Patent Application Publication No. 2009-0125232.

Figure 12:
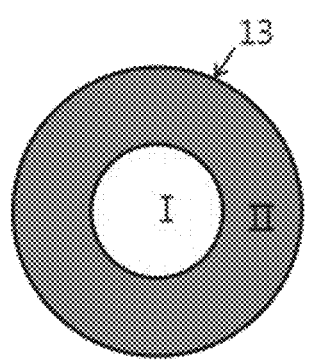
FIG. 12 illustrates that a first pixel area (I) has high light transmittance while a second pixel area (II) has low light transmittance as an average voltage lower than V(th) is applied to the first pixel area (I) of a LCD diaphragm of Normally White Mode and an average voltage higher than V(sat) is applied to the second pixel area (II), or as an average voltage higher than V(sat) is applied to the first pixel area (I) of an LCD diaphragm of Normally Black Mode and an average voltage lower than V(th) is applied to the second pixel area (II)

As shown in FIG. 12, when a voltage applied to the first pixel area (I) is different from a voltage applied to second pixel area (II), the visible light transmittance corresponding to the voltage applied to the first pixel area (I) is different from the visible light transmittance corresponding to the voltage applied to the second pixel area (II). In this case, the first pixel area (I) and the second pixel area (II) each independently take a role of the diaphragm, and thus the LCD diaphragm becomes a dual diaphragm.

For example, when the extent of the first pixel area (I) is the same as that of the second pixel area (II), if the visible light transmittance of the first pixel area (I) is higher than that of the second pixel area (II), the amount of light traveling through the first pixel area (I) into the image sensor is larger than the amount of light traveling through the second pixel area (II) into the image sensor. In other words, as the image, which passes through the diaphragm II corresponding to the second pixel area and is detected at the image sensor, is overlapped with the detected image, which passes through the diaphragm I corresponding to the first pixel area, the image at the image sensor has the deeper depth than the image gained when the first pixel area (I) and the second pixel area (II) have the same visible light transmittance. On the contrary, if the visible light transmittance of the first pixel area (I) is lower than that of the second pixel area (II), the image depth becomes shallower.

Figure 10:
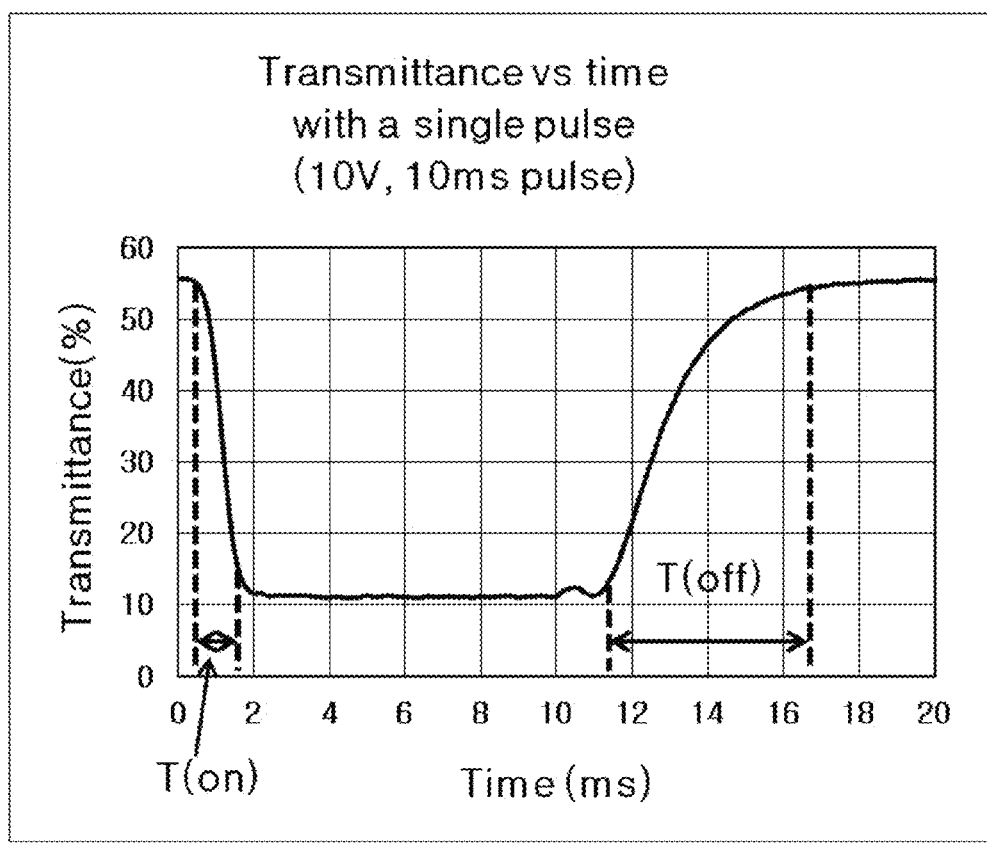
FIG. 10 is a graph illustrating a variance in speed of light transmittance of a Normally White Mode Guest-Host LCD panel to which a voltage of 10V with a width of 10 ms is applied as a single pulse.

FIG. 10 shows an example of a variance in light transmittance of a Normally White Mode Guest-Host LCD panel to which a voltage of 10 V is applied as a single pulse for 10 msec. The LCD panel has the maximum light transmittance in the initial state, and if the voltage of 10 V is applied, the light transmittance is decreased to the minimum value after about 1 msec. (T(on)). If the applied voltage is decreased to 0 V, the light transmittance is recovered to the maximum value after about 5 msec. (T(off)). In other words, response time T(on) of the LCD panel is about 1 msec., and T(off) is about 5 msec. Generally, the response time of an LCD panel is concerned with various factors including physical properties of liquid crystal materials, its measurement's temperature, the strength of applied electric fields, the waveform of the applied voltage, the structure of liquid crystal panels, the surface alignment effects, the liquid crystal molecular alignment angles, and the like. Also, as shown in FIG. 10, in case of the electro-optical response time of LCD panel, T(on) is not the same as T(off), T(on) ≠T(off), and usually, T(on) is shorter than T(off). In other words, the electro-optical response time when the electric field applied to an LCD panel is increased (rising time), is faster than the electro-optical response time when the electric field is decreased (relaxation time).

Figure 11:
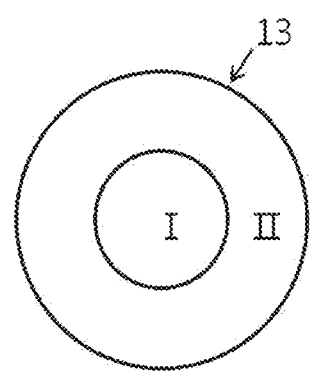
FIG. 11 illustrates that both a first pixel area (I) and second pixel area (II) have high light transmittance as an average voltage lower than V(th) is applied to both the first pixel area (I) and a second pixel area (II) of an LCD diaphragm of Normally White Mode, or as an average voltage higher than V(sat) is applied to both a first pixel area (I) and a second pixel area (II) of an LCD diaphragm of Normally Black Mode.

FIG. 11 shows that both the first pixel area (I) and the second pixel area (II) have high light transmittance because average voltage lower than V(th) is applied to both the first pixel area (I) and the second pixel area (II) of an LCD diaphragm of Normally White Mode, or because average voltage higher than V(sat) is applied to both the first pixel area (I) and the second pixel area (II) of a LCD diaphragm of Normally Black Mode.

FIG. 12 shows that the first pixel area (I) has high light transmittance and the second pixel area (II) has low light transmittance because average voltage lower than V(th) is applied to the first pixel area (I) of the LCD diaphragm of Normally White Mode and average voltage higher than V(sat) is applied to the second pixel area (II), or because average voltage higher than V(sat) is applied to the first pixel area (I) of the LCD diaphragm of Normally Black Mode and average voltage lower than V(th) is applied to the second pixel area (II).

Figure 13:
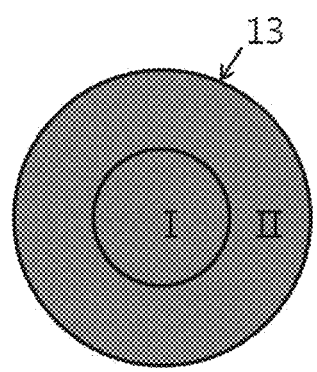
FIG. 13 illustrates that both a first pixel area (I) and a second pixel area (II) have low light transmittance as an average voltage higher than V(sat) is applied to both the first pixel area (I) and second pixel area (II) of an LCD diaphragm of Normally White Mode, or as an average voltage lower than V(th) is applied to both the first pixel area (I) and second pixel area (II) of an LCD diaphragm of Normally Black Mode.

FIG. 13 shows that both the first pixel area (I) and the second pixel area (II) have low light transmittance because average voltage higher than V(sat) is applied to both the first pixel area (I) and the second pixel area (II) of the LCD diaphragm of Normally White Mode, or because average voltage lower than V(th) is applied to both the first pixel area (I) and the second pixel area (II) of the LCD diaphragm of the Normally Black Mode.

To improve the image quality of digital cameras and smartphone cameras, Korean Patent Application Publication No. 2012-0016089, "Apparatus and Method for Processing a Continuous Shooting Using a Multi-Preset Data in Camera Device" is suggested, which recognizes multiple images for one object by changing the shooting function with multiple conditions and selects the best one among the multiple images. Similar to the above method, it is possible to recognize multiple images for one object by changing the setting of the diaphragm of the camera and to select the best one among the multiple images, whereby the image quality may be improved. The method of recognizing multiple images for the same screen is called a multi-frame detection.

In the multi-frame detection method, to minimize the change of the taken pictures, it is necessary to detect multiple images in a very short period of time. Accordingly, when detecting respective images with changing the condition of the LCD diaphragm, in order to reduce the time for detecting multiple images, it is required to reduce the time it will take to change the state of LCD diaphragm. For example, in the multi-frame detection method, when the state of the LCD diaphragm is sequentially changed to the state of FIGS. 11, 12, and 13 and three images are detected as the result, to change the initial state of the LCD diaphragm to the final state as soon as possible, the process of applying the voltage of V(sat) to each pixel of the diaphragm and of changing the state of the diaphragm into next state at the time of T(on) is sequentially performed.

In other words, as shown in FIG. 10, in case of the response time of the LCD diaphragm of Normally White Mode, as T(on) is shorter than T(off) (T(on)<T(off)), to detect three images in a short time period, the control unit 15 drives the pixels of the LCD diaphragm in the sequence of FIG. 11, FIG. 12, and FIG. 13 (FIG. 11→FIG. 12→FIG. 13). That is, to continuously detect the three images in a short time period, the voltage applied to pixels of the LCD diaphragm of Normally White Mode should be sequentially increased. After multi-frame detection of the picture that a user wants has been completed, the average voltage that has been applied to all pixels of the LCD diaphragm is decreased lower than V(th), whereby the state of the diaphragm goes back to the initial state, FIG. 11 after the response time T(off). Then, in the initial state, FIG. 11, the diaphragm is prepared to detect the next picture in the multi-frame method.

In case of the LCD diaphragm of Normally Black Mode, the voltage applied to pixels is sequentially increased. In other words, to detect one picture in the multi-frame method, the control unit 15 drives the pixels of the LCD diaphragm of Normally Black Mode in the sequence of FIG. 13, FIG. 12, and FIG. 11 (FIG. 13→FIG. 12→FIG. 11), and detects the image respectively at the state of FIG. 13, FIG. 12, and FIG. 11. After multi-frame detection of the picture has been completed, the average voltage that has been applied to all pixels of the LCD diaphragm is decreased lower than V(th), whereby the state of the diaphragm goes back to the initial state after the response time T(off). Then, in the initial state, the diaphragm is prepared to detect the next picture in the multi-frame method. In other words, the LCD diaphragm of Normally Black Mode is driven in sequence of FIG. 13, FIG. 12, and FIG. 11 (FIG. 13→FIG. 12→FIG. 11) and the image is detected at the respective state, and then the state goes back to the initial state, FIG. 13, whereby the one cycle for detecting one picture is completed.

Those skilled in the art will understand that the present invention can be implemented as other concrete forms without changing the inventive concept or essential features. Therefore, these embodiments as described above are only proposed for illustrative purposes and do not limit the present invention. It will be apparent to those skilled in the art that a variety of modifications and variations may be made without departing the spirit and scope of the present invention as defined by the appended claims. Further, such modifications and variations should not be understood independently from the technical idea or perspective of the present invention.

What is claimed is:

1. A light control apparatus for an image sensing device, disposed on a light path to an image sensor, for adjusting an amount of light incident on the image sensor,
the light control apparatus comprising:
   a Guest-Host LCD panel applied no polarizing film; and
   a control unit includes a multi-frame detection mode, wherein the control unit is configured to detect a succession of multiple images of the same scene and select a predetermined best image from among the multiple detected images, and the control unit is configured to gradually increase an average voltage applied to each of the respective pixels of the guest host LCD panel during an image detection period in order to reduce a time for detecting the succession of the multiple images,
   wherein:
      the Guest-Host LCD panel has a plurality of pixels forming closed curves or boundaries on a plane, which are electrically driven individually,
      the pixels have uniform light transmittance throughout the entire azimuth of the closed curves or boundaries with an origin.

2. The apparatus of claim 1, wherein the closed curve has a shape of a circle, an ellipse, or a regular polygon.

3. The apparatus of claim 2, wherein the regular polygon has rounded edges.

4. The apparatus of claim 1, wherein the Guest-Host LCD panel has the maximum visible light transmittance higher than 50%.

5. The apparatus of claim 1, wherein the Guest-Host LCD panel includes a pleochroic dye, and the Guest-Host LCD panel's mode is either Normally White or Normally Black.

6. The apparatus of claim 1, wherein the Guest-Host LCD panel has varied light transmittance according to the average applied voltage to the panel.

7. The apparatus of claim 1, further comprising,
   an IRIS system, disposed on the light path, for controlling an amount of light incident on the image sensor along the central axis.

8. The apparatus of claim 7, wherein the closed curve has an area smaller than an extent of the minimum aperture of the IRIS system.

9. The apparatus of claim 1, wherein the Guest-Host LCD panel is located in the light path of a lens unit.

10. The apparatus of claim 1, wherein after taking the multiple frames, the control unit decreases an averaged voltage applied to the pixels to go back to an initial state.

11. The apparatus of claim 1, wherein the Guest-Host LCD panel has multiple pixel areas that are each continuously overlapped on a same plane radially with an origin,
   the respective pixel areas each having a plurality of pixels forming closed curves or boundaries on a plane, and being electrically driven, individually; and
   the pixels having uniform light transmittance throughout an entire azimuth of the origin.

* * * * *